United States Patent [19]

Holzer et al.

[11] Patent Number: 4,983,464

[45] Date of Patent: Jan. 8, 1991

[54] ANTI-FIRE GLAZING

[75] Inventors: Gerhard Holzer; Udo Gelderie, both of Aachen, Fed. Rep. of Germany

[73] Assignee: Saint Gobain Vitrage, Courbevoie, France

[21] Appl. No.: 292,337

[22] Filed: Dec. 30, 1988

[51] Int. Cl.$^5$ ............................................. B32B 17/10
[52] U.S. Cl. ................................. 428/442; 428/412; 428/426; 428/913; 428/921; 428/436
[58] Field of Search ............... 428/426, 430, 431, 436, 428/437, 412, 913, 920, 921, 500, 524, 442; 351/166

[56] References Cited

U.S. PATENT DOCUMENTS

| | | | |
|---|---|---|---|
| 2,425,568 | 3/1942 | Ryan et al. | 428/437 |
| 3,249,487 | 5/1966 | Buckley et al. | 428/437 |
| 3,396,074 | 8/1968 | Christensen | 428/437 |
| 3,484,157 | 12/1969 | Crandon et al. | 351/166 |
| 3,865,619 | 2/1975 | Pennewiss et al. | 428/412 |
| 3,963,849 | 6/1976 | Thompson | 428/921 |
| 3,974,316 | 8/1976 | Jacquemin et al. | 428/437 |
| 3,997,700 | 12/1976 | Jacquemin et al. | 428/426 |
| 4,071,649 | 1/1978 | Jacquemin et al. | 428/913 |
| 4,104,427 | 8/1978 | Nolte et al. | 428/426 |
| 4,105,708 | 8/1978 | Parekh | 428/528 |
| 4,137,364 | 1/1979 | Ball, III et al. | 428/412 |
| 4,173,668 | 11/1979 | Hentzelt et al. | 428/920 |
| 4,190,698 | 2/1980 | De Boel et al. | 428/913 |
| 4,232,080 | 11/1980 | Orain et al. | 428/437 |
| 4,264,681 | 4/1981 | Girard et al. | 428/442 |
| 4,425,410 | 1/1984 | Farrell et al. | 428/500 |
| 4,444,825 | 4/1984 | Vanderstukken et al. | 428/437 |
| 4,453,320 | 6/1984 | Zimmermann et al. | 428/522 |
| 4,681,810 | 7/1987 | Gomez | 428/921 |
| 4,753,845 | 6/1988 | Sumi et al. | 428/412 |

FOREIGN PATENT DOCUMENTS

| | | | |
|---|---|---|---|
| 1284526 | 1/1962 | France | 428/437 |
| 337806 | 2/1929 | United Kingdom | 428/437 |
| 497642 | 12/1938 | United Kingdom | 428/437 |
| 1541371 | 2/1979 | United Kingdom . | |

*Primary Examiner*—Ellis P. Robinson
*Assistant Examiner*—Archene Turner
*Attorney, Agent, or Firm*—Oblon, Spivak, McClelland, Maier & Neustadt

[57] ABSTRACT

An anti-fire glazing composed of two sheets of glass maintained separated by a sealed intermediate peripheral frame, between which an aqueous solution containing a dissolved salt and a gelling agent has been placed. After filling, the solution is transformed into an aqueous gel, the aqueous phase of which contains the salt in solution, and the solid phase of which is a polymer. The gelling polymer is a cross-linked polyvinyl alcohol. A dialdehyde is used as the cross-linking agent.

4 Claims, No Drawings

ANTI-FIRE GLAZING

BACKGROUND OF THE INVENTION

1. Field of the Invention

The invention relates to the manufacture of an anti-fire glazings composed of two sheets of glass maintained separated from one another, between which a layer of an aqueous gel is placed, the aqueous phase of which contains at least one salt in solution and the solid gel phase of which is composed of a polymer.

2. Background of the Prior Art

Anti-fire glazings of this type are known from French Patent FR 2,346,548. During a fire, they work in the following manner: the heat is first absorbed by the water of the aqueous gel. This heat serves to vaporize the water. Then, after vaporization of the water and combustion of the solid organic phase, the salt forms a solid foam crust. This solid foam crust remains, even in the presence of very high heat, and constitutes a heat shield which, moreover, prevents the penetration of heat rays. Using these basic principles, anti-fire glazings have been produced which are flame arresters (Class G of the standard DIN 4102, 5th part dated September 1977) or fire-proof for 90 minutes (F 90 class of fire resistance according to the DIN)

In the known anti-fire glazings indicated above, the polymer component of the solid gelling phase is a cross-linked derivative of polyacrylic acid, for example the polyacrylic acid amide.

During the manufacture of gel anti-fire glazings based on a gelling agent composed of acrylic acid derivatives, monomers of said acrylic acid are used which, due to their toxic nature, have certain disadvantages.

The invention seeks to find, as the gel component, a chemical system which meets all the necessary requirements for an anti-fire glazing of this type, such as, for example, transparency and absence of cloudiness in the gel layer, high salt solubility, and complete solubility of the gelling compound in water where the salt is dissolved, but in which, however, no toxic substance or substance which is a danger to health is used.

SUMMARY OF THE INVENTION

In accordance with the invention, this object will be accomplished by the use of a cross-linked polyvinyl alcohol as the polymer component of the solid gelling phase.

It has been proven that the anti-fire glazings of the type described above, based on cross-linked polyvinyl alcohol as the solid phase, meet all the requirements imposed on the product. In particular, the glazings, even with a considerable thickness of gel, remain highly transparent, clear and colorless. It has also been proven that these characteristics do not change over time under normal conditions of use. In particular, the gels in accordance with the invention are stable up to temperature of 50° C. and higher and are also insensitive to cold up to −30° C. Their behavior in fire corresponds to that of conventional gel glazings. The components of the gellable solution are perfectly harmless to one's health and non-toxic. In addition, as opposed to known gelling systems, the anti-fire glazing in accordance with the invention contains no powerful oxidizing compound such as those necessary for the polymerization of acrylic acid derivatives, hence substantially decreasing the risks of corrosion of the peripheral metal frame.

DETAILED DESCRIPTION OF THE INVENTION

The glazings in accordance with the invention can be manufactured from various base products. Gel is preferably used for the solid phase, with the base products consisting of polyvinyl alcohol with an average molar weight of between 18000 and 224000 grams/mole and a hydrolysis rate of 75 to 100 mole percent. The polyvinyl alcohols of this type are soluble in water. Nevertheless, as the rate of hydrolysis increases, so too does the temperature at which the dissolving must be carried out. For example, during dissolving, polyvinyl alcohols with a hydrolysis rate of 98 to 100 mole percent require temperatures above 90° C.

The cross-linking of the polyvinyl alcohols of the gellable solution can be created by the addition of various materials to the solution. For example, bifunctional aldehydes are appropriate for the crosslinking reaction. This is especially the case with glutardialdehyde, terephthaldialdehyde and glyoxal. One requirement common to all these compounds is obviously their solubility in water and even in the solution containing the salt and the polyvinyl alcohol.

The concentration of the polyvinyl alcohol and the aldehyde-based compounds must be selected such that, on the one hand, the gel obtained has the desired properties, such as hardness, stability, cloudiness, and polymerization shrinkage and, on the other hand, the cross-linking does not occur too rapidly such that there is sufficient time for the manufacture and use of the gellable solution. One final condition must be met relative to the concentrations this is the one concerning viscosity, which must be sufficiently low for the solution to be able satisfactorily to fill the hollow parts of multiple glazings.

In order to fulfill the preceding requirements, the concentration of polyvinyl alcohol in the aqueous solution must be selected such that, for a polyvinyl alcohol with an average molar weight of approximately 18000 grams/mole, it does not exceed 40% by weight. For an average molar weight of 224000 grams/mole, there will be a maximum limit of 10% by weight.

With regard to the ratio between the amounts of aldehyde and polyvinyl alcohol, preferred ranges have also been determined. While theoretically molar ratios between the polyvinyl alcohol and the dialdehyde of 1/1 to 1/1000 are possible, it has been found that, with ratios above 1/100, the gels obtained tended to cause too much cloudiness and shrinkage. In practice, where glutardialdehyde is used, molar ratios between the polyvinyl alcohol and the dialdehyde of 1/1 to 1/10 have been shown to be satisfactory, and with the use of terephthaldialdehyde, the range should be 1/1 to 1/100.

The cross-linking reaction can be obtained in a satisfactory manner provided the value of the pH is between 2.5 and 5. This can be obtained by adding to the system sufficient quantities of an acid which is compatible with the solution or even by adding a compatible acid salt. It would be possible to obtain the cross-linking reaction even without the use of an acid induced catalysis, however, the use of an adapted pH value enables the reaction time to be substantially reduced.

Similarly, the type and quantity of the salt intended to ensure the essential anti-fire function of the glazing can be selected as a function of its compatibility with the rest of the chemical system. It has thus been noted that calcium chloride and magnesium chloride are particularly suitable whereas, for example, sodium chloride is barely compatible with the solution. Polyacid salts such as $Na_2SO_4$, for example, have been shown to be incompatible with the polyvinyl alcohols.

In principle, the preparation of the gellable solution takes place in the following manner: the polyvinyl alcohol is first dissolved to the desired concentration by being placed in water in the form of a powder or granules. The dissolving takes place at a high temperature on the order of 90° C. under constant stirring. After approximately 40 minutes, the polyvinyl alcohol is completely dissolved. A suitable amount of salt is then added to the solution and the stirring is continued until it is completely dissolved. Another method consists of starting by dissolving the salt in the water or even of simultaneously dissolving the salt and polyvinyl alcohol. All the dissolving takes place at high temperatures and under constant stirring. Finally, just before filling the space in the multiple glazing with the gellable solution, the dialdehyde and the catalyst acid are introduced therein in suitable quantities. After having carried out a careful homogenization of the solution prepared in this manner, it is placed into the space between the sheets of glass. The glazings filled in this manner are then subjected to a temperature of 50° to 70° C. at which the mixture polymerizes within a time span depending on the composition which ranges between about 2 and 15 hours.

Several examples of the preparation of gellable solutions are given below. The gelling conditions of the gel are also given.

EXAMPLE 1

Without stopping the stirring of the solution, 8750 grams of polyvinyl alcohol with an average molar weight of 84000 grams/mole and a rate of hydrolysis of 88 mole percent were dissolved in a solution comprised of 5350 grams of $MgCl_2.6H_2O$ in 8800 grams of water at 80° C. 2000 grams of a solution of glyoxal, 30% by weight, were added to the polyvinyl alcohol solution obtained in the above manner, which corresponded to a molar ratio between the polyvinyl alcohol and the glyoxal of 1 to 100. To this solution of 35% by weight of polyvinyl alcohol with a concentration of 10% of $MgCl_2$ an aqueous solution with 10% by weight of hydrochloric acid was added dropwise until the pH reached a value of 2.8. After sufficient homogenization, the solution was placed into the space between the sheets of an insulating glazing. Gelling was completed at a temperature of 50° C. in the space of two hours.

EXAMPLE 2

750 grams of polyvinyl alcohol with an average molar weight of 127000 grams/mole and a rate of hydrolysis of 88 mole percent was dissolved in an aqueous solution composed of 4250 grams of $CaCl_2$ in 20000 grams of water at a temperature of 90° C., while stirring constantly. To this solution with 3% by weight of polyvinyl alcohol and salt, 23.5 grams of a 25% by weight aqueous solution of glutardialdehyde was added. This corresponded to a polyvinyl alcohol/glutardialdehyde molar ratio of 1 to 10. After complete homogenization of the solution, a pH value of 3.8 was noted, due to the hydrolysis of the calcium chloride. As in Example 1, the solution prepared in this manner was introduced into the space in an insulating glazing. Gelling took place in 5 hours at 50° C.

EXAMPLE 3

1250 grams of polyvinyl alcohol with an average molecular weight of 224000 grams per mole and a rate of hydrolysis of 100 mole percent were dissolved in 18400 grams of water at a temperature of 95° C., while stirring constantly. 5350 grams of $MgCl_2.6H_2O$ were added to this solution, then the mixture was stirred at a temperature of 90° C. until the salt was completely dissolved. To this solution with 5% by weight of polyvinyl alcohol which contained 10% by weight of $MgCl_2$, 22.3 g of a solution with 25% by weight of glutardialdehyde were added. In this manner a molar ratio between the polyvinyl alcohol and the glutardialdehyde of 1 to 10 was obtained. Following the hydrolysis of the salt in solution, a pH value of 3.9 was determined. The glazings filled as in Examples 1 and 2 gelled at a temperature of 50° C. in 5 hours.

EXAMPLE 4

1850 grams of polyvinyl alcohol with an average molar weight of 127000 grams per mole and a rate of hydrolysis of 88 mole percent were first dissolved in 18600 grams of water at a temperature of 90° C. while stirring constantly. Continuing to stir the solution, 4500 grams of $CaCl_2$ were added. In this manner a solution with a composition by weight of 7.5% polyvinyl alcohol and 18% $CaCl_2$ was obtained. 19.7 grams of terephthaldialdehyde were added thereto. In this manner a molar ratio was obtained between the polyvinyl alcohol and the terephthaldialdehyde of 1 to 10. Following the hydrolysis of the salt in solution, a pH of approximately 3.8 was obtained. The glazings filled in the same manner as in the preceding examples gelled in the space of 3 hours at a temperature of 70° C. This temperature was necessitated by the poor solubility of terephthaldialdehyde at low temperatures.

EXAMPLE 5

While stirring constantly, 10000 grams of polyvinyl alcohol with an average molar weight of 18000 grams per mole and a rate of hydrolysis of 79 mole percent were dissolved in 12200 grams of water at a temperature of 90° C. To the solution prepared in this manner, 1250 grams of $CaCl_2$ and 1560 grams of a solution with 25% glutardialdehyde were added. Stirring was continued until this was completely homogenized. Following the hydrolysis of the salt, this solution with 40% by weight of polyvinyl alcohol and 5% salt reached a pH of 4.5. The polyvinyl alcohol/glutardialdehyde molar ratio in this case was 1 to 7. This solution was used to fill the space in a double glazing and the system gelled in the space of 15 hours at 50°.

EXAMPLE 6

1250 grams of polyvinyl alcohol with a molar weight of 202000 grams/mole and a rate of hydrolysis of 98 moles percent together with 10750 grams of $MgCl_2.6H_2O$ were dissolved in 13000 grams of water at a temperature of 95° C. while stirring constantly. To the solution prepared in this manner 25 grams of a solution with 25% by weight of glutardialdehyde were added, which gave a polyvinyl alcohol/glutardialdehyde molar ratio of 1 to 10. The solution with 5% polyvinyl alcohol and 20% $MgCl_2$ gave, after hydrolysis, a pH of 3.3. Gelling of such a solution placed in a double glazing took place in 4 hours at 50° C.

EXAMPLE 7

While stirring constantly, 2250 grams of polyvinyl alcohol with an average molar weight of 224000 grams per mole and a rate of hydrolysis of 100 moles percent were dissolved in 2000 grams of water at a temperature of 98° C. 2700 grams of $MgCl_2.6H_2O$ were added to this solution and stirring was continued until the salt was completely dissolved. 8 grams of a solution with 25% by weight of glutardialdehyde was then added to this solution with 9% by weight of a polyvinyl alcohol and 5% $MgCl_2$. In this manner a polyvinyl alcohol/glutardialdehyde molar ratio of 1 to 2 was obtained. An aqueous solution with 10% by weight of hydrochloric acid was then added dropwise to this solution which contained a mixture of polyvinyl alcohol and salt, such that a pH of 3.2 was obtained for the mixture. After sufficient homogenization, the mixture was placed into the space in an insulating glazing and left to gel for 3 hours at 50° C.

EXAMPLE 8

1250 grams of polyvinyl alcohol with an average molar weight of 127000 grams per mole and with a rate of hydrolysis of 88 moles percent were dissolved in 20000 grams of water at a temperature of 90° C. under constant stirring was continued until the salt was completely dissolved. 132 grams of terephthaldialdehyde at a temperature of 70° C. were then added to the solution with 5% by weight of polyvinyl alcohol and 15% $CaCl_2$. The molar ratio of the polyvinyl alcohol to the terephthaldialdehyde was then 1 to 10. Following the hydrolysis of the salt, the pH obtained was 3.8. The gelling of the mixture obtained in this manner, after being placed in a double glazing, took place in the space of 5 hours at 70° C.

Obviously, numerous modifications and variations of the present invention are possible in light of the above teachings. It is therefore to be understood that within the scope of the appended claims, the invention may be practiced otherwise than as specifically described herein.

What is claimed as anew and desired to be secured by Letters Patent of the United States:

1. An anti-fire glazing comprised of at least two sheets of glass between which is an aqueous gel comprising a cross-linked polyvinyl alcohol of average molecular weight between about 18,000 g/mol and 2224,000 g/mol and a salt that is soluble in said aqueous gel wherein when the molecular weight is 18,000, said cross-linked polyvinyl alcohol does not exceed 40% by weight and when the molecular weight is 224,000 it does not exceed 10% by weight.

2. The glazing of claim 1, wherein said salt is $MgCl_2$, $CaCl_2$ or a mixture thereof.

3. The glazing of claim 1, wherein said polymer comprises, as a cross-linking agent, a dialdehyde.

4. The anti-fire glazing of claim 1 wherein the polyvinyl alcohol has a hydrolysis rate of 75 to 100 mol percent.

* * * * *